(12) United States Patent
Grougan et al.

(10) Patent No.: US 6,735,507 B2
(45) Date of Patent: May 11, 2004

(54) FOUR WHEEL STEERING SYSTEM AND METHOD FOR TRAILERING

(75) Inventors: Paul A. Grougan, Novi, MI (US); Kenneth D. Norman, Ann Arbor, MI (US); Thomas C. Zebehazy, Rochester, MI (US); Scott P. Sherman, Fenton, MI (US); Karen A. Boswell, Freeland, MI (US); Steven D. Klein, Munger, MI (US); Charles R. Worner, Freeland, MI (US)

(73) Assignees: General Motors Corporation; Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/454,447

(22) Filed: Jun. 4, 2003

(65) Prior Publication Data
US 2004/0002800 A1 Jan. 1, 2004

Related U.S. Application Data

(60) Provisional application No. 60/392,616, filed on Jun. 28, 2002.

(51) Int. Cl.[7] ............................................... B62D 6/00
(52) U.S. Cl. ..................... 701/41; 180/408; 180/418; 180/445
(58) Field of Search ................ 701/41, 42; 180/408, 180/409, 410, 411, 412, 413, 414, 415, 416, 443, 444, 445, 446

(56) References Cited

U.S. PATENT DOCUMENTS

| | | | |
|---|---|---|---|
| 4,958,698 A | 9/1990 | Kirschner | 180/140 |
| 5,111,901 A | 5/1992 | Bachhuber et al. | 180/140 |
| 5,217,083 A | 6/1993 | Bachhuber et al. | 180/140 |
| 5,224,042 A | 6/1993 | Morrison | 364/424.05 |
| 5,417,299 A | 5/1995 | Pillar et al. | 180/140 |
| 5,607,028 A | 3/1997 | Braun et al. | 180/408 |
| 6,039,143 A | 3/2000 | Kielar et al. | 180/412 |
| 6,273,446 B1 | 8/2001 | Paul | 280/448 |
| 6,370,460 B1 | 4/2002 | Kaufmann et al. | 701/41 |
| 6,564,131 B2 * | 5/2003 | Sebastian et al. | 701/41 |
| 6,580,988 B2 * | 6/2003 | Lin et al. | 701/41 |
| 6,643,573 B2 * | 11/2003 | Dickinson et al. | 701/41 |
| 2003/0045980 A1 * | 3/2003 | Boswell et al. | 701/41 |

* cited by examiner

*Primary Examiner*—Gary Chin
(74) *Attorney, Agent, or Firm*—Michael D. Smith

(57) ABSTRACT

An all wheel steering system for a vehicle comprising a controller having a first input for receiving a signal from a hand wheel position sensor, a second input for receiving a signal from a vehicle speed sensor, and a third input for receiving a signal that varies depending upon whether a trailer is hitched the vehicle. The controller generates an output for controlling a rear wheel steering actuator. The output varies as a function of the first, second, and third inputs such that when a trailer is hitched to the vehicle the out-of-phase rear steer amount at low speeds is reduced and the in-phase rear steering amount at high speeds is increased.

6 Claims, 1 Drawing Sheet

FOUR WHEEL STEERING SYSTEM AND METHOD FOR TRAILERING

This application claims benefit of earlier-filed provisional application 60/392,616 filed Jun. 28, 2002, which is incorporated by reference in its entirety.

BACKGROUND

The present invention relates to steering systems for land vehicles. Specifically, the present invention relates to such a steering system in which more than one axle has steering capabilities.

With very few exceptions, all known land vehicles have at least two transverse axles on which wheels are located for supporting the vehicle and allowing it to move forward. Typically, the wheel or wheels supported by the front axle are steerable -that is, they are permitted to rotate on a steering axis which extends in a direction having a large vertical component. Thus, the front wheel or wheels are permitted to steer left or right, thus causing the vehicle as a whole to turn left or right.

Recently, all-wheel steering systems have been produced to improve maneuverability and stability while driving. In such systems, the rear wheel or wheels are steered in concert with the front wheel or wheels. In systems having more than two axles, all the wheels are steered together in concert. For purposes of this disclosure, the term, "front steer" will refer to steering the one or more wheels to the front of a midpoint of the vehicle while the term, "rear steer" will refer to steering the one or more wheels to the rear of a midpoint of the vehicle, it being understood that while most vehicles have a single front axle and a single rear axle, many other combinations are possible depending on the design of the vehicle. While two wheeled vehicles are included by these definitions, as a practical matter, vehicles will generally have four or more wheels, although two and three wheeled-vehicles having all-wheel steering are certainly possible.

Determining the ideal or optimum amount of rear steering with respect to front steering has proven to be a vexing issue. One way to define the amount of rear steering is as a fraction of the front steering. Prior art all-wheel steering systems sometimes provide for negative rear steering at low speeds and positive steering at high speeds. That is, the rear-steer to front-steer ratio at low speeds is negative, causing the rear wheels to turn in an opposite direction than the front wheels, while at high speeds, the rear-steer to front-steer steering ratio is positive, and so the rear wheels turn in the same direction as the front wheels.

By steering the rear wheels in an opposite direction from the front wheels at low speeds, improved maneuverability is achieved. However there is a drawback that the rear end of an all-wheel vehicle will swing wide, i.e., go in the opposite direction as intended. While this does provide an advantage for particularly long vehicles or vehicles towing a trailer by preventing the back end from clipping the corner apex, it can be problematic when the back end unexpectedly swings wide when pulling out of tight spaces such as from gas-pumps or parking spaces. It has also been found that at high speeds, the optimum ratio for rear steering amount is greater when towing a trailer than when not towing a trailer, the optimum ratio being determined by such factors as responsiveness. See "Benefits of Four-Wheel-Steering on Trailering Performance" by Charles R. Worner, incorporated herein by reference.

SUMMARY

The above discussed and other drawbacks and deficiencies of the prior art are overcome or alleviated by an all-wheel steering system for a vehicle comprising a controller having a first input for receiving a signal from a hand wheel position sensor, a second input for receiving a signal from a vehicle speed sensor, and a third input for receiving a signal that varies depending upon whether a trailer is hitched to said vehicle. The controller generates an output for controlling a rear wheel steering actuator. The output varies as a function of the first, second, and third inputs such that when a trailer is hitched to said vehicle the out-of-phase rear steer amount at low speeds is reduced and the in-phase rear steering amount at high speeds is increased.

BRIEF DESCRIPTION OF THE DRAWINGS

Referring now to the drawings.

DETAILED DESCRIPTION

Figure 1:
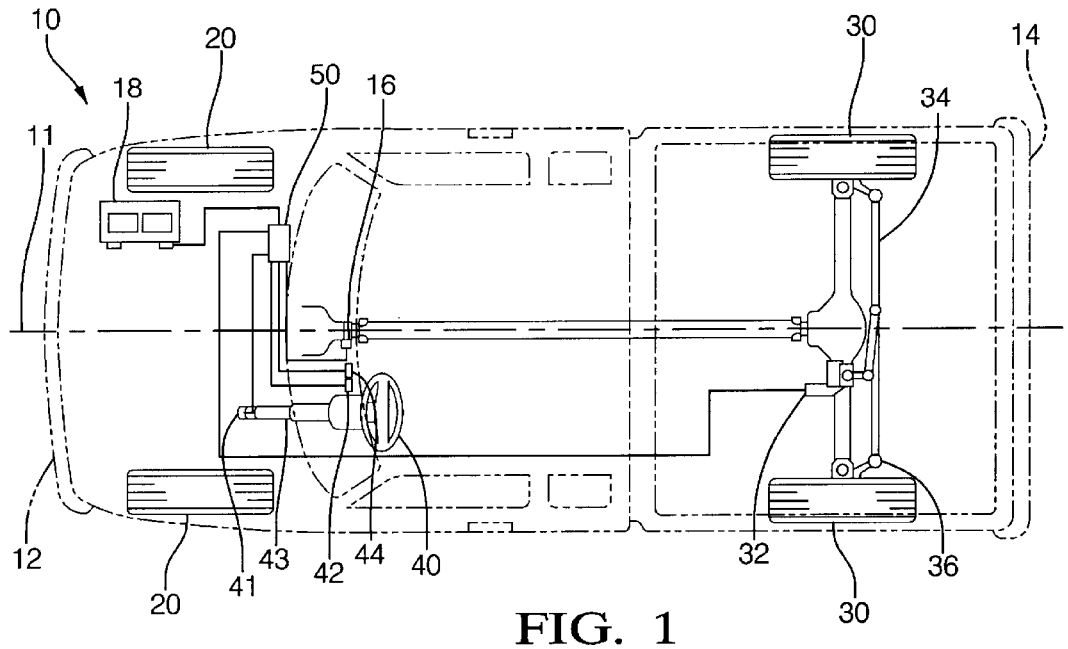
FIG. 1 shows a schematic representation of an all-wheel steering system.

FIG. 1 shows a schematic representation of an exemplary vehicle 10 having an all-wheel steering system. Vehicle 10 has a front end 12 with front wheels 20 and rear end 14 with rear wheels 30. Hand wheel 40 is fixed to steering shaft 43 which rotates on its axis. Steering shaft 43 may be connected to front wheels 20 via a traditional mechanical and/or power-assisted steering mechanism (not shown). Alternatively, front wheels 20 may be controlled exclusively through a steer-by-wire system in which no mechanical connection is present, such as that described in commonly-assigned U.S. Pat. No. 6,370,460 to Kaufrnann et al., which is wholly incorporated herein by reference.

Hand wheel position sensor 41 reads the angular displacement of hand wheel 40 from a nominal position, such as a centered position which corresponds to the front wheels 20 being aligned with the longitudinal axis 11 of vehicle 10, i.e., an infinite turning radius or zero steering amount as shown in FIG. 1. Position sensor 41 is in electronic communication with steering controller 50 which controls the steering angle of rear wheels 30. Steering controller 50 is powered by its connection to battery 18 and, in addition to sensing the angular position of hand wheel 40, determines the speed of vehicle 10 from vehicular speed sensor 16, and all-wheel steering mode selection from mode selection switch 44. Controller 50 includes a microprocessor, volatile memory for storing changeable parameters, non-volatile for storing software instructions, and other related components known in the field of micro-electronic controllers. Controller 50 utilizes a look-up table or mathematical algorithm to determine a desired rear wheel steering angle for the current front-wheel steering angle, vehicle speed, and selected steering mode.

Figure 2:
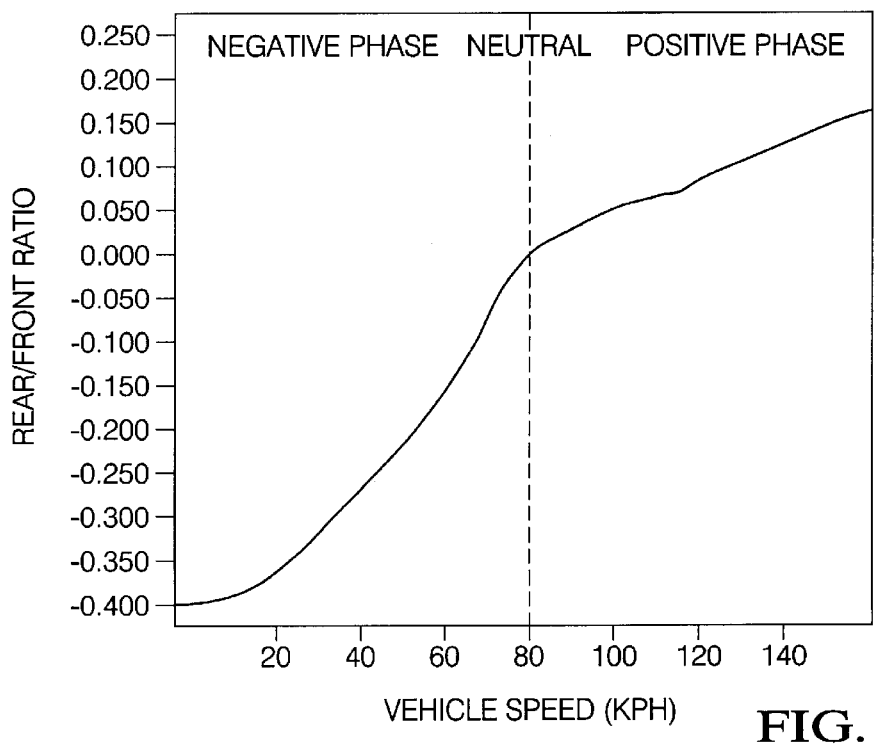
FIG. 2 shows an exemplary rear/front steering ratio graph.

Nominally, the rear steering amount is determined as a fraction of the front steering amount for a particular vehicular speed. FIG. 2 shows an exemplary graph that relates rear steering amount to front steering amount verses vehicle speed. Note here, that for speeds less than 80 kilometers per hour (50 miles per hour) the rear wheels turn in an opposite direction from the front wheels, albeit to a lesser degree. This is known as out-of-phase or negative phase steering, and provides improved maneuverability at lower speeds. However, at speeds above 80 kilometers per hour, the rear wheels turn in the same direction as the front wheels. This is known as in-phase or positive-phase steering and provides better handling and improved responsiveness when changing lanes, etc. at high speeds.

The optimum amount of rear steer when towing a trailer is different than when not towing a trailer. To accommodate this difference, a driver mode selection switch 44 (FIG. 1) allows the driver to select between trailering and non-trailering modes to provide optimal advantages of rear steering for both towing and non-towing. Dash-board indicator 42 provides a visual confirmation to the driver that trailering mode is enabled.

The trailering mode decreases the out of phase rear steer amount at low speeds and increases the in-phase rear steering amount at high speeds. In particular, the following formula defines a preferred rear-to-front optimum steering ratio:

$$R/F\ Ratio = \frac{D_r \cdot N_r \cdot u^2 - 57.3 \cdot b \cdot G}{D_f \cdot N_f \cdot u^2 + 57.3 \cdot a \cdot G} \quad \text{Equation (1)}$$

$$N_f = 1 - \frac{M_t}{M_{tv}}\left(\frac{d}{d+c}\right)\frac{e}{b} \quad \text{Equation (2)}$$

$$N_r = 1 + \frac{M_t}{M_{tv}}\left(\frac{d}{d+c}\right)\left(\frac{l+e}{a}\right) \quad \text{Equation (3)}$$

And:
- u=Vehicle Speed (m/s)
- $D_f$=Front Cornering Compliance (deg/gravity)
- $D_r$=Rear Cornering Compliance (deg/gravity)
- $N_f$=Front Cornering Compliance Modifier (Equal to 1 in Absence of Trailer)
- $N_r$=Rear Cornering Compliance Modifier (Equal to 1 in Absence of Trailer)
- a=Longitudinal Distance from Tow Vehicle Front Axle to Center of Gravity (m), typically 35 percent to 55 percent of the wheelbase,
- b=Longitudinal Distance from Tow Vehicle Rear Axle to Center of Gravity (m), typically 45 percent to 65 percent of the wheelbase
- l=Tow-Vehicle Wheelbase (m)
- e=Longitudinal Distance from Tow Vehicle Rear Axle to Trailer Coupling (m), varies according to vehicle size but is typically 40 to 50 percent of the Tow Vehicle wheelbase
- c=Longitudinal Distance from Trailer Coupling to Trailer Center of Gravity (m), typically 85 to 90 percent of the trailer wheelbase.
- d=Longitudinal Distance from Trailer Center of Gravity to Trailer Axle (m), typically 10 to 15 percent of the trailer wheelbase or (c+d)
- G=Gravitational Constant (9.81 m/s²/g)
- $M_{tv}$=Total Mass of Tow Vehicle
- $M_t$=Total Mass of Trailer The values for front and rear cornering compliance $D_f$, $D_r$, respectively, are defined in the SAE Paper, "The Cornering Compliance Concept for Description of Vehicle Directional Control Properties" no. 760713 by R.T. Bundorf and R.L. Leffert. Front cornering compliance for typical vehicles ranges from 3 to 12 deg/g. Rear cornering compliance for typical vehicles ranges from 2 to 8 deg/g, with the difference between front and rear cornering compliance typically ranging from 1 to 7 deg/g.

The formula corrects for sideslip attributable to the trailer and reduces the sideslip angle towards zero. The sideslip angle is the difference between the actual direction of travel and the longitudinal axis of the tow vehicle, and is attributable to a number of effects including tire slip, and steering and suspension geometry.

To accommodate trailers of different sizes and shapes, values most suitable for all types of trailers can be determined for these parameters c, d, and $M_t$. Controller 50 can calculate the output using the above formula during use. Alternatively, controller 50 may store a translation or look-up table for outputting the rear wheel steer amount based on input speed and hand wheel position. One of a plurality of look-up tables is referenced during trailering-mode all-wheel steering, wherein the table being referenced corresponds to outputs generated by the formula above, while another table is referenced in non-trailering-mode which corresponds to conventional all-wheel steering algorithms. The trailering-mode look-up table can be a compromise between what is required for the largest trailer specified for the vehicle and a smaller trailer.

While preferred embodiments have been shown and described, various modifications and substitutions may be made thereto without departing from the spirit and scope of the invention. It is to be understood that the invention has been described by way of illustration only, and such illustrations and embodiments as have been disclosed herein are not to be construed as limiting to the claims.

We claim:

1. An all-wheel steering system for a vehicle, the steering system comprising a controller having a first input for receiving a signal from a hand wheel position sensor and a second input for receiving a signal from a vehicle speed sensor, said controller generating an output for controlling a rear wheel steering actuator, said output varying as a function of said first input, said second input, wherein, when said steering system is in a trailering mode, said output generates a rear wheel steering amount according to the formula:

$$R \approx \frac{D_r \cdot N_r \cdot u^2 - 57.3 \cdot b \cdot G}{D_f \cdot N_f \cdot u^2 + 57.3 \cdot a \cdot G} \times F$$

where:

$$N_f = 1 - \frac{M_t}{M_{tv}}\left(\frac{d}{d+c}\right)\frac{e}{b},$$

$$N_r = 1 + \frac{M_t}{M_{tv}}\left(\frac{d}{d+c}\right)\left(\frac{l+e}{a}\right),$$

- R=rear wheel steer amount,
- F=front wheel steer amount,
- u=vehicle Speed (m/s),
- $D_f$=front cornering compliance (deg/gravity),
- $D_r$=rear cornering compliance (deg/gravity),
- $N_f$=front cornering compliance modifier (Equal to 1 in Absence of Trailer),
- $N_r$=rear cornering compliance modifier (Equal to 1 in Absence of Trailer),
- a=longitudinal distance from tow vehicle front axle to center of gravity (m),
- b=longitudinal distance from tow vehicle rear Axle to center of gravity (m),
- l=tow-vehicle wheelbase (m),
- e=longitudinal distance from tow vehicle rear axle to trailer coupling (m),
- c=longitudinal distance from trailer coupling to trailer center of gravity (m),
- d=longitudinal distance from trailer center of gravity to trailer axle (m),
- G=gravitational constant (9.81 m/s²/g)
- $M_{tv}$=total mass of tow vehicle (kg), and $M_r$=total mass of trailer (kg).

2. The steering system of claim 1 wherein said rear steering amount is defined by:

$$R = \frac{D_r \cdot N_r \cdot u^2 - 57.3 \cdot b \cdot G}{D_f \cdot N_f \cdot u^2 + 57.3 \cdot a \cdot G} \times F.$$

3. The steering system of claim 1 wherein said controller includes a look-up table having data determined at least in part using said formula.

4. A method of steering rear wheels of a vehicle, the method comprising controlling a rear wheel steering actuator by varying it as a function of a position of the hand wheel and a speed of the vehicle, such that when a trailer is hitched to said vehicle said rear wheels are steered according to the formula:

$$R \approx \frac{D_r \cdot N_r \cdot u^2 - 57.3 \cdot b \cdot G}{D_f \cdot N_f \cdot u^2 + 57.3 \cdot a \cdot G} \times F$$

where:

$$N_f = 1 - \frac{M_t}{M_{tv}} \left(\frac{d}{d+c}\right) \frac{e}{b},$$

$$N_r = 1 + \frac{M_t}{M_{tv}} \left(\frac{d}{d+c}\right) \left(\frac{l+e}{a}\right),$$

R=rear wheel steer amount,
F=front wheel steer amount,
u=vehicle Speed (m/s),
$D_f$=front cornering compliance (deg/gravity),
$D_r$=rear cornering compliance (deg/gravity),
$N_f$=front cornering compliance modifier (Equal to 1 in Absence of Trailer),
$N_r$=rear cornering compliance modifier (Equal to 1 in Absence of Trailer),
a=longitudinal distance from tow vehicle front axle to center of gravity (m),
b=longitudinal distance from tow vehicle rear Axle to center of gravity (m),
l=tow-vehicle wheelbase (m),
e=longitudinal distance from tow vehicle rear axle to trailer coupling (m),
c=longitudinal distance from trailer coupling to trailer center of gravity (m),
d=longitudinal distance from trailer center of gravity to trailer axle (m),
G=gravitational constant (9.81 m/s²/g)
$M_{tv}$=total mass of tow vehicle (kg), and
$M_t$=total mass of trailer (kg).

5. The method of 4 wherein said rear wheels are steered according to the formula:

$$R = \frac{D_r \cdot N_r \cdot u^2 - 57.3 \cdot b \cdot G}{D_f \cdot N_f \cdot u^2 + 57.3 \cdot a \cdot G} \times F.$$

6. The method of claim 4 wherein said controlling includes using a lookup table populated with data determined in part using said formula.

* * * * *